US008418084B1

(12) United States Patent
Tischer

(10) Patent No.: US 8,418,084 B1
(45) Date of Patent: Apr. 9, 2013

(54) SINGLE-TOUCH MEDIA SELECTION

(75) Inventor: Steven N. Tischer, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1087 days.

(21) Appl. No.: 12/130,802

(22) Filed: May 30, 2008

(51) Int. Cl.
G06F 3/033 (2006.01)
(52) U.S. Cl. .................................... 715/863; 715/831
(58) Field of Classification Search .................. 715/831, 715/863
See application file for complete search history.

(56) References Cited

U.S. PATENT DOCUMENTS

| | | | | |
|---|---|---|---|---|
| 5,359,712 A | * | 10/1994 | Cohen et al. | 715/723 |
| 5,803,914 A | * | 9/1998 | Ryals et al. | 600/407 |
| 6,151,426 A | * | 11/2000 | Lee et al. | 382/319 |
| 6,256,027 B1 | * | 7/2001 | Jeong et al. | 715/788 |
| 6,262,724 B1 | * | 7/2001 | Crow et al. | 715/723 |
| 6,385,351 B1 | * | 5/2002 | Simske et al. | 382/312 |
| 6,486,896 B1 | * | 11/2002 | Ubillos | 715/784 |
| 6,599,130 B2 | * | 7/2003 | Moehrle | 434/365 |
| 6,757,027 B1 | * | 6/2004 | Edwards et al. | 348/722 |
| 6,952,221 B1 | * | 10/2005 | Holtz et al. | 715/723 |
| 7,085,994 B2 | * | 8/2006 | Gvily | 715/234 |
| 7,325,199 B1 | * | 1/2008 | Reid | 715/723 |
| 2001/0024211 A1 | * | 9/2001 | Kudukoli et al. | 345/763 |
| 2002/0005867 A1 | * | 1/2002 | Gvily | 345/760 |
| 2002/0097270 A1 | * | 7/2002 | Keely et al. | 345/764 |
| 2002/0175931 A1 | * | 11/2002 | Holtz et al. | 345/716 |
| 2003/0184599 A1 | * | 10/2003 | Beaudoin | 345/853 |
| 2004/0010507 A1 | * | 1/2004 | Bellew | 707/102 |
| 2004/0056883 A1 | * | 3/2004 | Wierowski | 345/719 |
| 2004/0199395 A1 | * | 10/2004 | Schulz | 704/278 |
| 2004/0267387 A1 | * | 12/2004 | Samadani | 700/94 |
| 2005/0206644 A1 | * | 9/2005 | Kincaid | 345/440 |
| 2005/0210418 A1 | * | 9/2005 | Marvit et al. | 715/863 |
| 2005/0275638 A1 | * | 12/2005 | Kolmykov-Zotov et al. | 345/179 |
| 2006/0013462 A1 | * | 1/2006 | Sadikali | 382/132 |
| 2007/0103452 A1 | * | 5/2007 | Wakai et al. | 345/173 |
| 2008/0055272 A1 | * | 3/2008 | Anzures et al. | 345/173 |
| 2008/0155421 A1 | * | 6/2008 | Ubillos et al. | 715/724 |
| 2008/0252597 A1 | * | 10/2008 | Heynen et al. | 345/157 |
| 2008/0313541 A1 | * | 12/2008 | Shafton et al. | 715/725 |
| 2009/0079700 A1 | * | 3/2009 | Abernathy | 345/173 |

* cited by examiner

Primary Examiner — Steven Sax
Assistant Examiner — Shen (Connie) Shiau
(74) Attorney, Agent, or Firm — Scott P. Zimmerman PLLC

(57) ABSTRACT

A method of using a single gesture to initiate a pre-defined action is described. The single gesture, in one example, is a single contiguous sequence of vector inputs starting with engagement and ending with disengagement. Using a single gesture to initiate a pre-defined action facilies ease of use.

20 Claims, 7 Drawing Sheets

SINGLE-TOUCH MEDIA SELECTION

BACKGROUND

The increasing popularity of presenting and sharing data files, in particular linear data streams including audio and video files, has created a need to be able to manipulate these files readily. Manipulating may include selecting a portion for playback, extracting a desired selection of the total file, and/or altering attributes inherent in a file. For example, attributes for an image or video file include, but are not limited to, color, chrominance, hue, tint, file compression, sampling rate, resolution, color space, filters, and the like. Attributes for an audio file include, but are not limited to, bass, treble, filters, reverb, echo, file compression, sampling rate, and the like. Such manipulations can be cumbersome, particularly on small form factor devices such as laptops, mobile phones, smartphones, personal digital assistants (PDAs), portable media players, and the like.

SUMMARY

This summary is provided to introduce single-touch media selection, which is further described below in the Detailed Description. This summary is not intended to identify the essential features of the claimed subject matter, nor is it intended for determining the scope of the claimed subject matter.

In one implementation, a computing device may be equipped with an input device and logic to implement single-touch media selection. Single-touch media selection enables the user to alter a data file based on input from the input device. Using a series of contiguous gestures, the user may select a specific portion of the data file and/or alter attributes of that file.

Other systems, methods, and/or computer program products according to embodiments will be or become apparent to one with skill in the art upon review of the following drawings and detailed description.

BRIEF DESCRIPTIONS OF THE DRAWINGS

The disclosure is made with reference to the accompanying figures. In the figures, the left most reference number digit identifies the figure in which the reference number first appears. The use of the same reference numbers in different figures indicates similar or identical terms.

DETAILED DESCRIPTION

A single-touch media selector method is described next. With the advent of electronic presentations and small form-factor devices, there is a growing demand for methods to easily and quickly select portions of and/or modify attributes of a media file using a single contiguous gesture.

Figure 1:
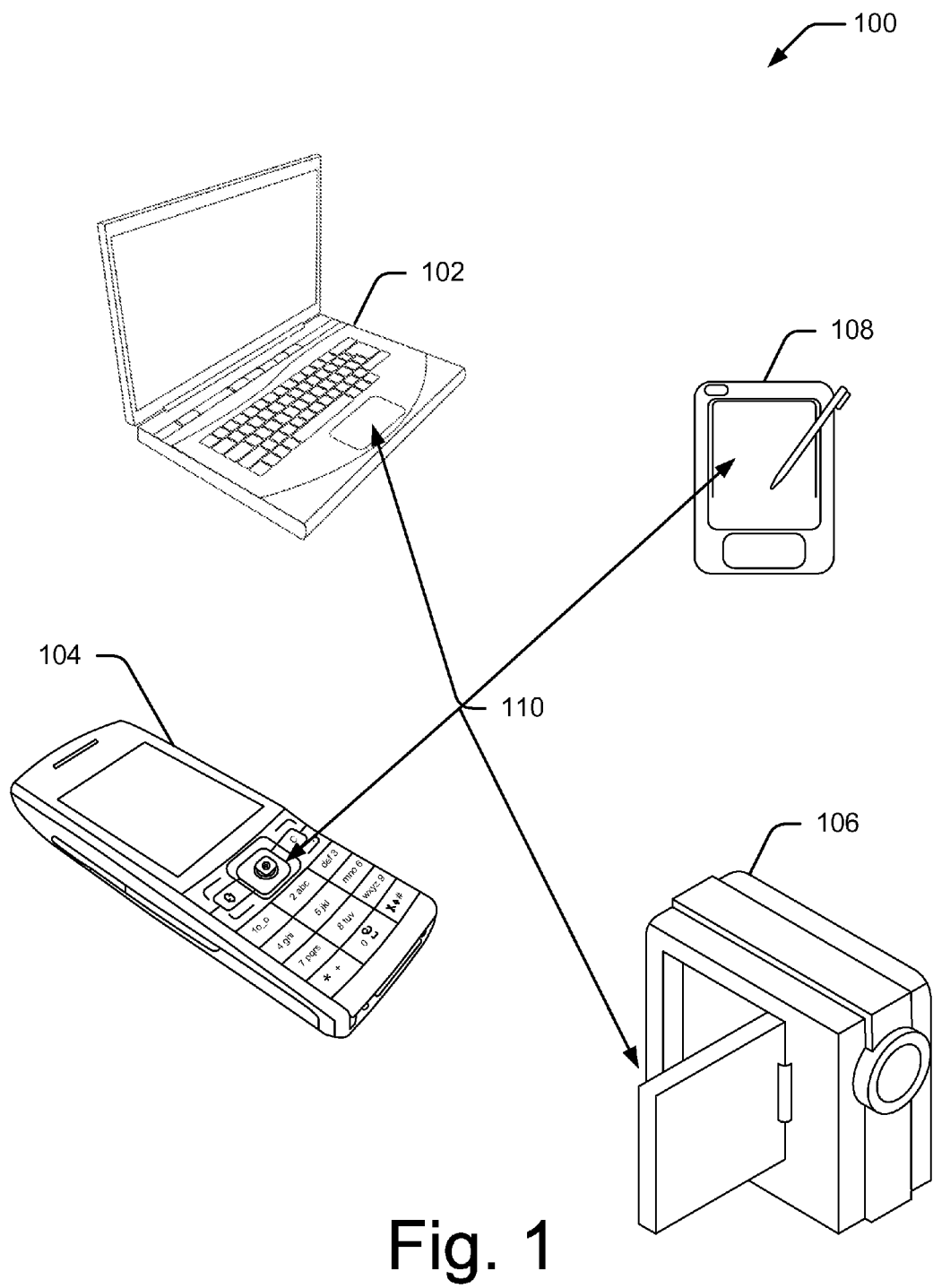
FIG. 1 depicts several illustrative devices which may utilize the single-touch media selector method.

With this in mind, FIG. 1 depicts an illustrative assortment 100 of possible devices utilizing a single-touch media selector in accordance with the present disclosure. The assortment 100 includes, without limitation, a laptop computer 102, a cellular phone 104, a video camera 106, and a handheld computer 108. Each of these devices has some form of input device 110.

The input device 110 may include, but is not limited to, a touch sensitive pad, touch sensitive display, mouse, keyboard, joystick, trackball, mouse, light pen, laser pointer, accelerometer, motion detector, data glove, motion tracking system, eye tracking system, camera, combinations of any of these, and the like. The input device 110 is capable of providing data pertaining to a single contiguous gesture to a processor of the device implementing the method.

According to exemplary embodiments, a single contiguous gesture is a single stream of input data from one input device. For example, a single contiguous gesture includes an input from a single finger on a touchpad, motion of a single mouse, movement of a single joystick, touch of a single stylus, motion of a single hand, and the like, but not the use of two fingers, two mice, two hands, and so forth.

The input device 110 is configured to provide some vector values of the single contiguous gesture to the processor implementing this method. A vector value includes, but is not limited to, a direction, duration, velocity, rate of acceleration, length, and the like.

The input device 110 also is capable of registering the user's engagement and disengagement with the input device and providing this data to the processor of the device implementing this method. Engagement includes, but is not limited to, touching a touchpad, activating a mouse button, activating a stylus button, making a particular gesture, pressing a button, and the like, to signal that a single contiguous gesture is about to begin. Examples of engagement include clicking a button on a stylus, pressing on the touchpad, or a pre-defined hand motion in a data glove or virtual space environment. Disengagement indicates the end of the contiguous gesture by, for example, the removal of a finger from a touchpad, release of a mouse button, or the like.

Figure 2:
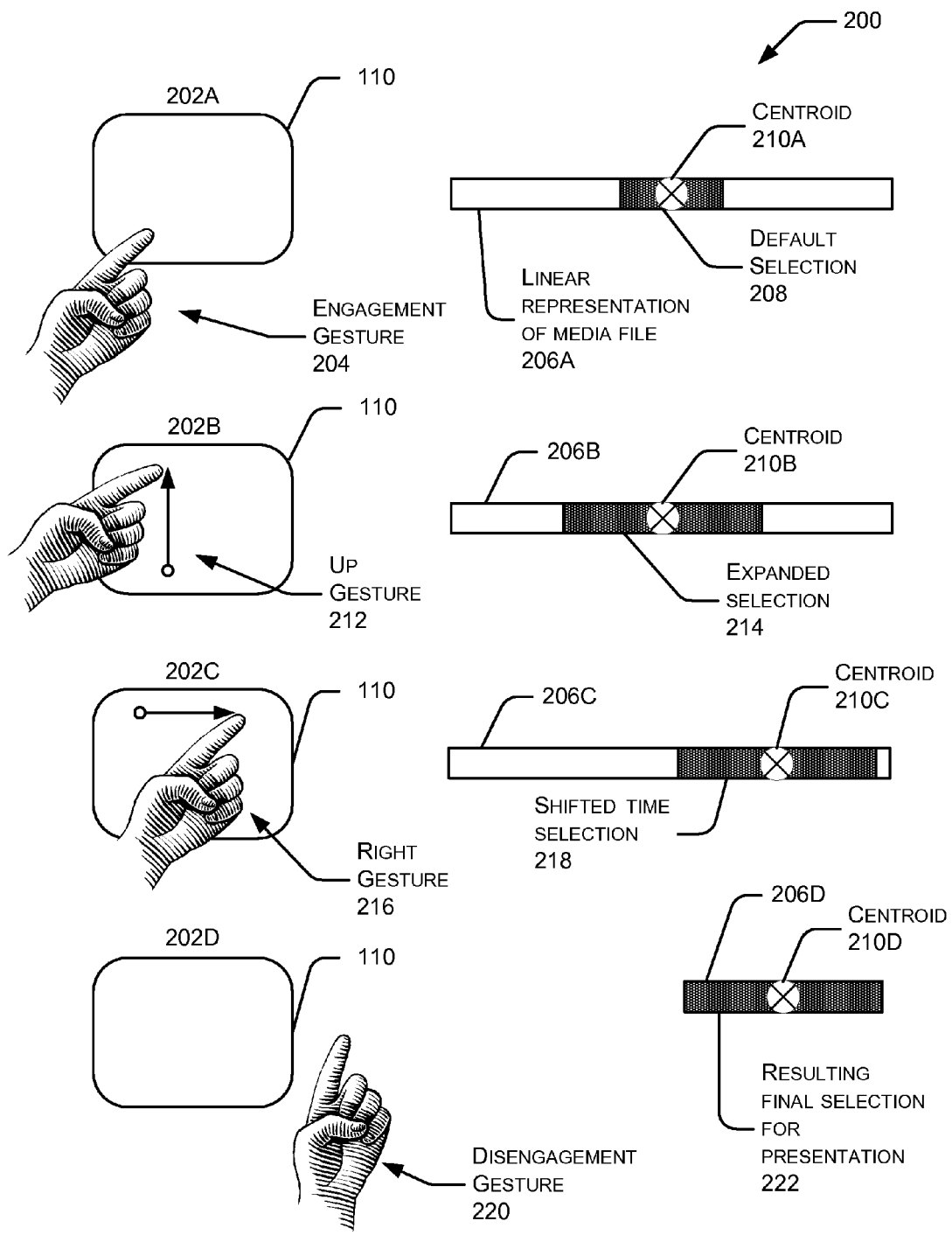
FIG. 2 depicts an illustrative schematic of a series of gestures and their effects on a linear representation of a media file.

FIG. 2 depicts an illustrative schematic of a series of gestures 200 and their effects on a linear representation of a media file.

At 202A, a touchpad 110 registers an engagement gesture 204 of the user bringing a finger into contact with the touchpad surface. A linear representation of a media file 206A is shown, with a default selection 208 being triggered by the engagement 204. The center of the default selection 208 is indicated by centroid 210A. The long axis of the linear representation of file 206A represents time, with time increasing from left to right.

At 202B, the user moves his finger in an up gesture 212 along the surface of the touchpad 110. In this example, the up gesture 212 is associated with the command to expand the boundaries of the default selection temporally (i.e., select frames before and after the default selection) equally from the midpoint of the selection. A resulting linear representation 206B illustrates a newly expanded selection 214 with centroid 210B present in the center of the selection.

At 202C, the user now continues the gesture, moving to a right gesture 216 along the surface of the touchpad 110. In this example, the right gesture 216 is associated with the command to shift the selection forward in time (i.e., select a later section of the media file). A resulting linear representation 206C illustrates a shifted time selection 218 now shifted to the right and associated centroid 210C, which is again in the center of the selection.

At 202D, the user removes his finger from the touchpad 110, thus providing a disengagement gesture 220. In this example, the disengagement gesture 220 is associated with the command to trim any unselected portions of the linear media file. A resulting linear representation 206D is a final selection with centroid 210D in the center ready for presentation 222. One possible implementation is that upon disengagement the user is prompted to place a tag on the new final selection. This tag may contain descriptive information or terms suitable for searching or future manipulation. A default tag may be provided (e.g., user name, initials, date, time, etc.), or the user may input a custom tag.

While FIG. 2 shows a touchpad as the input device, as described earlier, the input device may be a touch sensitive display. In the case of a touch sensitive display, the linear representation of a media file may be touched, creating an associated default selection with a centroid at the point of the touch. The centroid on the display may then be manipulated by touch in similar fashion as described above to modify the selection.

Additionally, several gestures with corresponding pre-defined actions may be combined. For example, a gesture up and to the right may expand the selection while also moving the centroid to the right. It is also possible that a modification to a selection may take place during execution of the gesture, but that such modification is not finalized until disengagement. For example, while sliding a finger to the right, the selection may slide to the right in real-time along the linear representation of the media file, but does not finalize until disengagement (that is, the player may not actually navigate to the new location in the file until disengagement).

Figure 3:
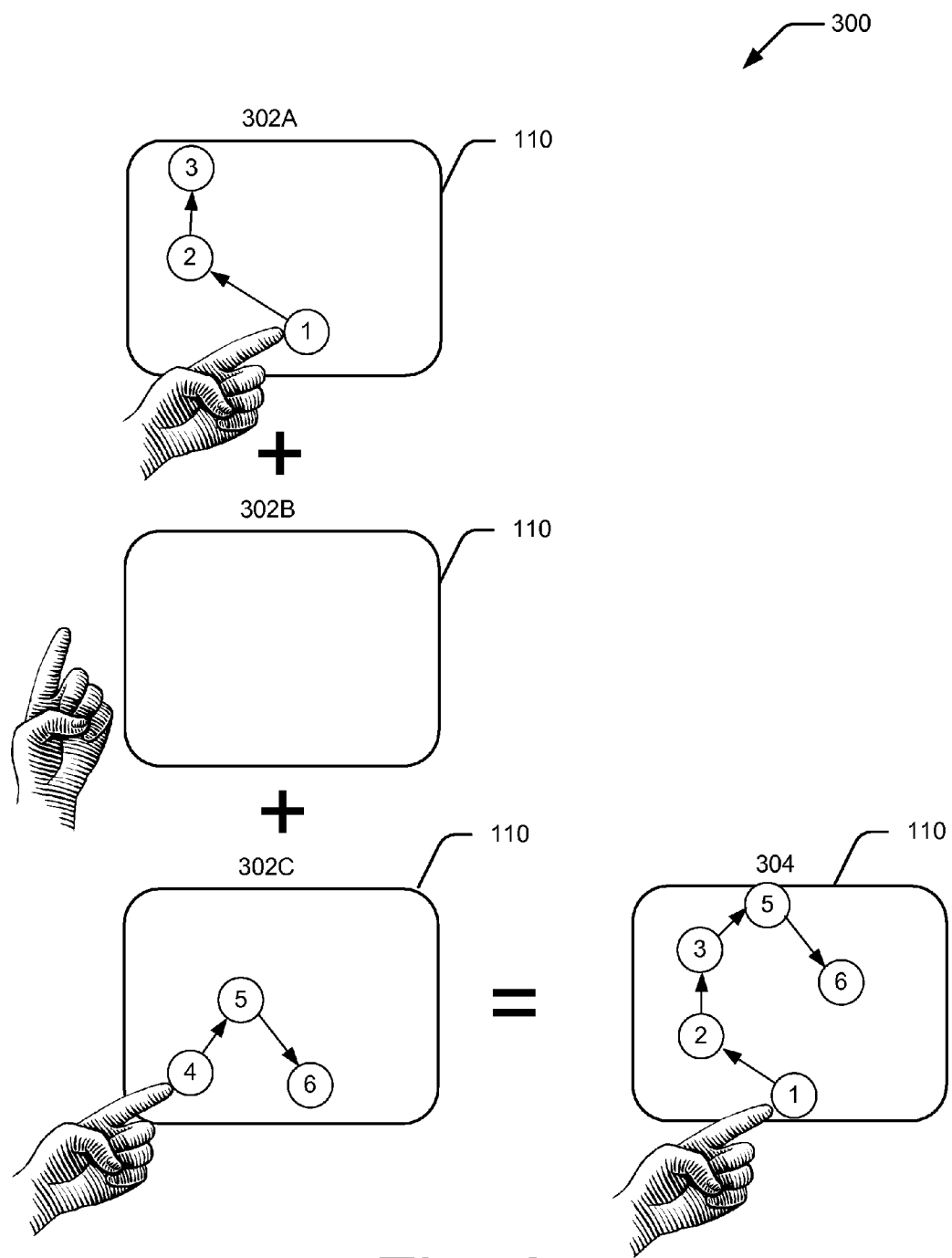
FIG. 3 depicts an illustrative schematic of the ability to momentarily disengage and re-engage to complete a gesture.

FIG. 3 depicts an illustrative schematic of the ability to momentarily disengage and re-engage to complete a gesture 300. For example, at 302A a user initiates a gesture using a finger at point 1 on the touchpad 110. Moving to point 2 and then 3 while the finger is engaged with the touchpad 110, the user has insufficient room on the touchpad to complete the desired gesture. At 302B, the user momentarily disengages. At 302C, the user has repositioned his finger to point 4, re-engaged, and continued to move through points 5 and 6 to complete the gesture. Utilizing the ability to momentarily disengage, the gestures of 302A through 302C are considered a single contiguous gesture, and thus, may be interpreted as being the same as a gesture 304.

The interval of time which may elapse between disengagement and re-engagement may be fixed, set by the user, or adaptively adjusted.

Figure 4:
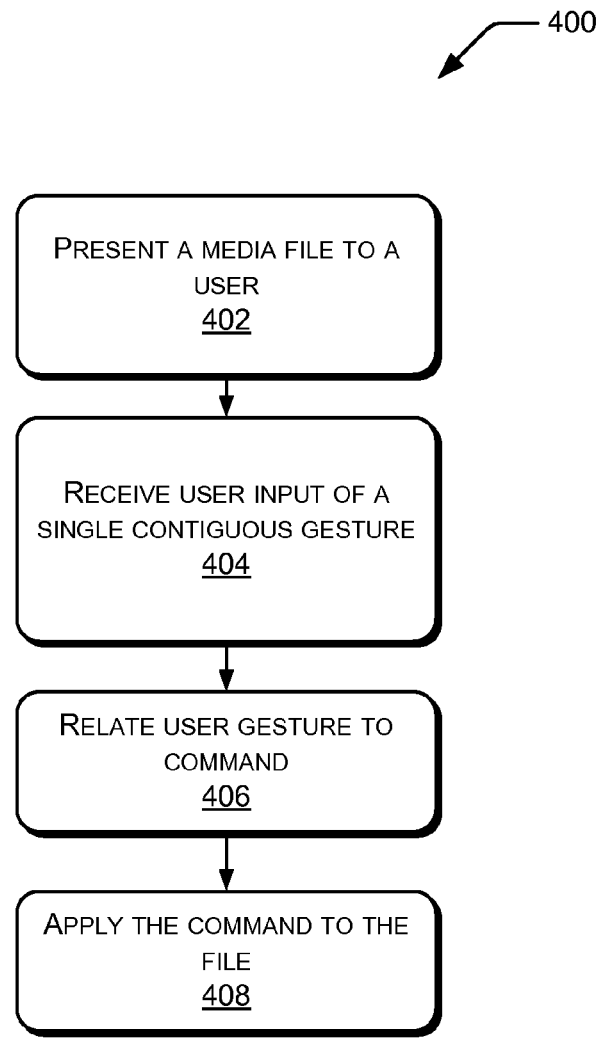
FIG. 4 depicts a flow diagram of single-touch media selection, according to exemplary embodiments.

FIG. 4 depicts a flow diagram of a single-touch media selector method 400, according to exemplary embodiments.

At 402, a media file is presented to a user by a processor utilizing an output device. This media file may be a data file encompassing numeric or statistical data, a video file, a still image, an audio file, a document, or the like.

At 404, the method 400 receives the user input comprising a single contiguous gesture from an input device 110. According to exemplary embodiments, a single contiguous gesture is a single stream of input data from one input device, and may include multiple different vector components or qualities.

At 406, the vector qualities of the user input are analyzed by a relation module and compared to a library of previously defined user gestures. Based on this analysis, the gesture is related to an associated command. Commands may be pre-programmed or user defined. The command associated with a single gesture may vary depending upon the context in which the gesture is made. For example, an up gesture may increase the temporal boundaries of the default selection in a video file, while the same up gesture may increase the bass in an audio file. In some implementation, the user may be presented with a graphical icon suggestive of the gestures or the predetermined command or both to facilitate use.

The method 400 may also monitor the inputs of a particular user identified by a user identification module and the actual command selected for execution. A particular user may be identified by a login, biometric, distinctive gesture, and the like. The method may then adjust the correspondence between the particular user's input and the desired pre-defined action, thus adapting to that user's gestural idiosyncrasies using a learning module.

At 408, the associated command is executed by a change application module and applied to the file. The resulting modification to the file may be to the file data itself, or an overlay applied to the file, or a combination of the two. The results may then be stored to memory and/or output to the user via a display, speakers, or other output means.

Figure 5:
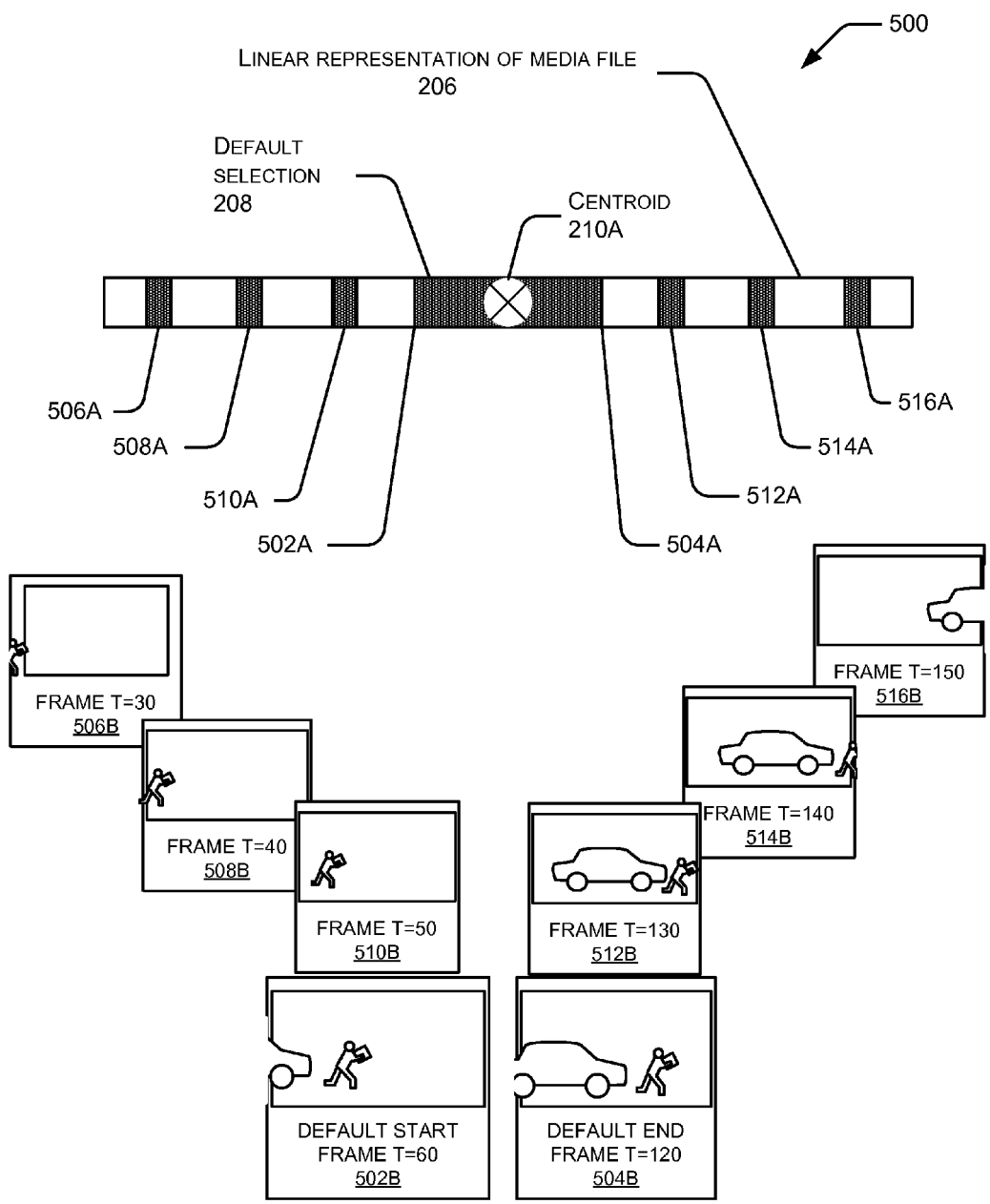
FIG. 5 depicts an illustrative schematic of an audition area for a video media file comprising a sample of video frames before and after selected endpoint frames of the media selection.

FIG. 5 is an illustrative schematic of an audition area comprising selection of video from a linear representation of a file and the display of samples at intervals before and after the current selection endpoints. The audition area may be, but is not limited to, implementation on the devices and gestures shown earlier in FIG. 1-3.

At 500, the linear representation of the file from FIG. 2 is shown at 206 as well as the initial default selection 208 and associated centroid 210A occurring upon engagement. In FIG. 5 the file is assumed to be a video file. However, as discussed above, the techniques described herein are applicable to other types of media files as well. Also, the long axis of the linear representation of file 206 represents time, with time increasing from left to right.

At 502A, the beginning point of the default selection 208 is indicated (as shown, for example, in FIG. 2). At 504A, the default end point is indicated.

In FIG. 5, the method has been configured to use a sampling module to sample data in the media file at pre-defined intervals of 10 seconds before and after the endpoints of the default selection (as shown, for example, at 208 in FIG. 2). Thus 506A is at time=30 seconds, 508A is at time=40 seconds, 510A is at time=50 seconds, starting point 502A is at time=60 seconds, ending point 504A is at time=120 seconds, 512A is at time=130 seconds, 514A is at time=140 seconds, and 516A is at time=150 seconds. This sample interval may be pre-determined or user configurable. The interval may be based on time, frame, track, chapter, bookmark, or suitable temporal divisor or other divisor. Thus, while a linear sample time interval is shown here (i.e., every 10 seconds), logarithmic, exponential, or other functions may be used to, for example, set the sample intervals to 1, 10, 100, 1000.

Multiple interval levels may also be displayed simultaneously. For example, the sample interval may encompass the five frames immediately prior to the default start, then every fifth frame thereafter, and a similar display for the default ending frame. Such display permits fine tuning of the selection by providing more displayed frames closer to the selection boundaries, while displaying frames farther out to facilitate rapid boundary changes.

After these sample points have been determined, they may be presented to the user. At 506B, 508B, 510B, 502B, 504B, 512B, 514B, and 516B a series of still images are shown depicting the three ten-second intervals before and three ten-second intervals after the default selection endpoints. The samples presented vary depending upon the type of data being manipulated. In this example a video file is being modified. Therefore, the user may be presented with samples comprising still images or short clips.

The user may then utilize the single-touch method to modify the default selection 206 to encompass the desired start and end points shown in the audition area. As endpoints are changed, the samples may be updated to reflect the new endpoints. The modified selection may be finalized either by disengagement or by another gesture. When finalized, the unselected portion of the modified selection may be removed, leaving the modified selection as the entire media file. Alternatively, the selected portion may be removed, or the selected portion may be tagged.

Figure 6:
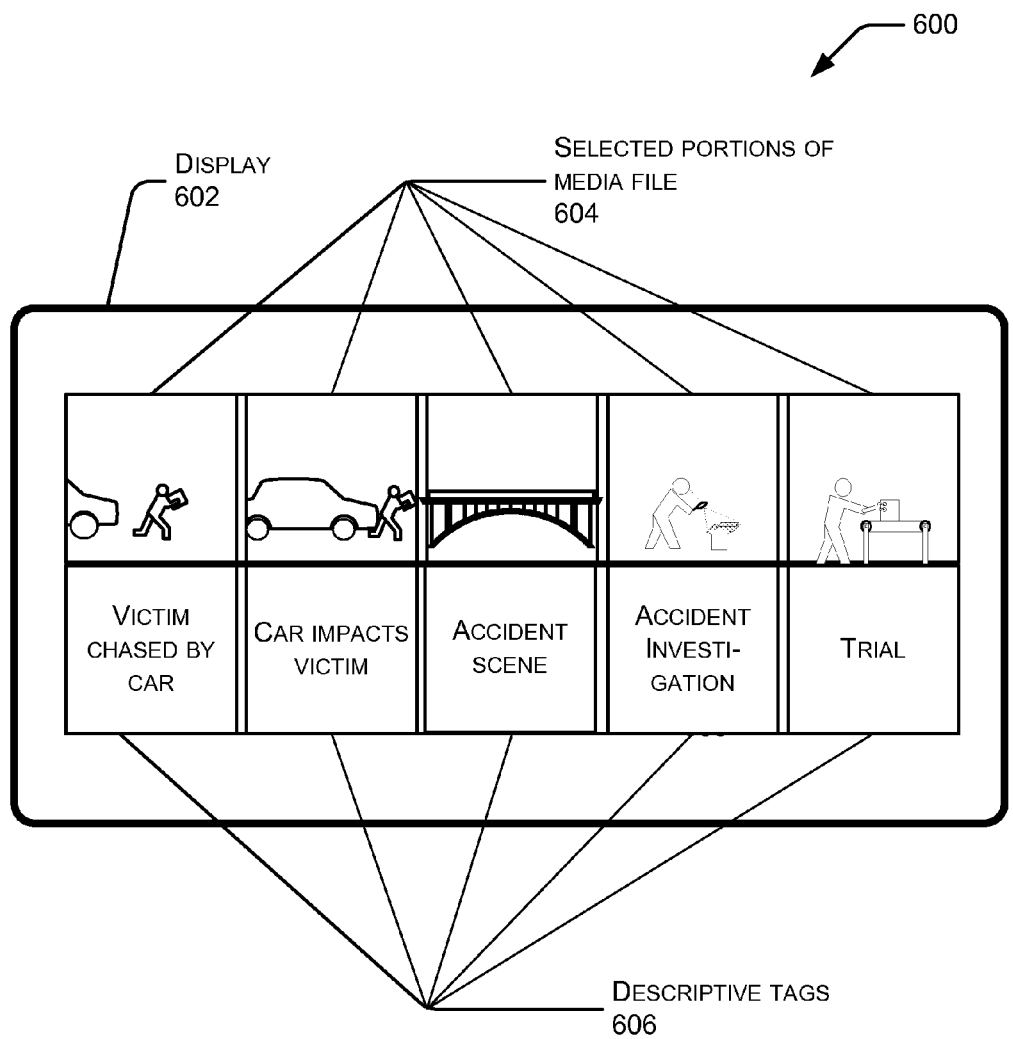
FIG. 6 depicts an illustrative schematic of a sample display showing a series of previously selected media selections and their associated tags.

FIG. 6 depicts at 600 an illustrative schematic of a sample display showing previously selected media selections and their associated tags.

A display 602 is shown with samples 604 from the previously selected portions of the media file. The samples 604 may be from the endpoints, midpoints, or designated key frames in a selection. Each sample 604 may be annotated with a tag 606. These tags 606 may display metadata, rich media component information, user data, default data, and the like. Tag information may be used to facilitate selection, organization, modification, or other manipulations of the media file.

Figure 7:
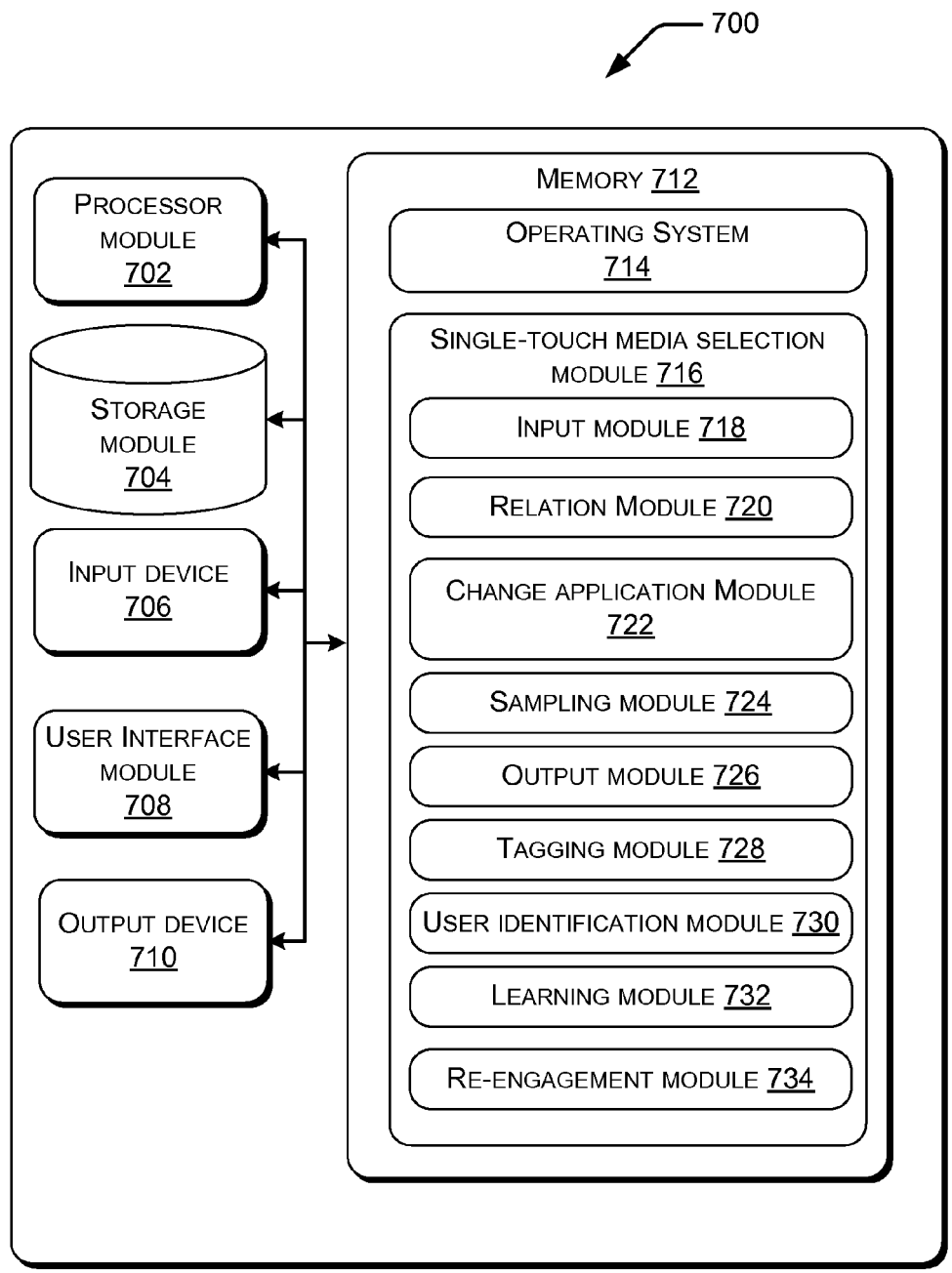
FIG. 7 depicts a schematic of an exemplary apparatus implementing single-touch media selection.

FIG. 7 depicts a schematic of an exemplary apparatus 700 implementing single-touch media selection. An apparatus 700 implementing this method may utilize a processor module 702 with an associated storage module 704 configured to store at least a portion of a media file and the input device 706 comprising an input device such as 110 as described above.

A user interface module 708 facilitates interaction between the user and the apparatus. An output device 710 displays or otherwise presents data to the user. Memory 712 may contain an operating system 714 and a single-touch media selection module 716.

Within the single-touch media selection module 716, input module 718 is configured to receive a single contiguous gesture starting with engagement and ending with disengagement from the input device 706. A relation module 720 is configured to relate the received gesture with a pre-defined change to the file. Once the pre-defined change to the file is determined in the relation module 720, a change application module 722 may then apply the change to the media file.

A sampling module 724 may also be configured to output a sample of data from designated intervals before and after the endpoints of a selection. This output may be on a suitable output device 710 compatible with the file being modified.

A tagging module 728 may also be configured to tag the selected subsets of the file. This tagging can include prompting the user to input data, accept a default, or automatically generate data regarding the selected subset.

A user identification module 730 may be configured to identify a particular user. As described above, this identification may be by a login, biometric, distinctive gesture, and the like. Once identified, a learning module 732 may then be configured to adjust the correspondence between the particular user's input and the desire pre-defined change using known learning algorithms.

A re-engagement module 734 may also be present and coupled to the processor module. The re-engagement module permits a user to momentarily disengage while entering a gesture, then re-engage to complete the gesture. As discussed previously with respect to FIG. 3, the interval of time which may elapse between temporary disengagement and re-engagement may be fixed, set by the user, or adaptively adjusted.

The method may be implemented in computer readable storage media such as a hard drive, a magnetic disk drive (e.g., floppy disks), an optical disk drive (e.g., CD-ROM, DVD, etc.), flash memory, and other types of tangible computer-readable media.

Although methods for single-touch media selection have been described in language specific to certain features and/or methodological acts, the invention is not necessarily limited to the specific features or acts described. Rather, the specific features and acts are disclosed as illustrative forms of implementing the invention.

The invention claimed is:

1. A method of manipulating a video media file, the method comprising:
graphically representing a video media file to a user via a display as a linear icon having a long axis representing increasing time;
receiving a user input at a point of engagement of the display that selects a time along the linear icon;
graphically representing a default selection in the linear icon of a portion of the video media file;
graphically creating a centroid in the default selection at the point of engagement;
receiving another user input in the display comprising a single contiguous gesture starting in an upward direction from the centroid and ending with disengagement of the display;
relating the single contiguous gesture to a pre-defined command configured to graphically expand a temporal boundary of the default selection such that as the gesture continually moves upward the temporal boundary continues to equally expand from the centroid;
applying the pre-defined command upon the disengagement to create a modified default selection;
trimming unselected portions from the video media file; and
displaying the modified default selection on the display.

2. The method of claim 1, wherein the display comprises a touch sensitive pad.

3. The method of claim 1, further comprising displaying a sample of frames at designated intervals before and after the default selection.

4. The method of claim 1, further comprising equally expanding a left boundary and a right boundary of the default selection.

5. The method of claim 1, further comprising prompting to tag the modified default selection.

6. The method of claim 1, further comprising displaying icons of gestures associated with pre-defined commands.

7. A non-transitory computer-readable storage medium comprising instructions that when executed cause a processor to perform operations, the operations comprising:
graphically representing a video media file via a display as a linear icon having a long axis representing increasing time;
receiving a user input at a point of engagement of the display that selects a time along the linear icon;
graphically representing a default selection in the linear icon of a portion of the video media file;
graphically creating a centroid in the default selection at the point of engagement;
receiving another user input in the display comprising a single contiguous gesture starting in an upward direction from the centroid and ending with disengagement of the display;
relating the single contiguous gesture to a pre-defined command configured to equally expand a graphical left temporal boundary and a graphical right temporal boundary from the centroid of the default selection as the gesture continually moves upward;

applying the pre-defined command upon the disengagement to create a modified default selection;

trimming unselected portions from the video media file; and displaying the modified default selection on the display.

8. The non-transitory computer-readable storage medium of claim 7, wherein the operations further comprise tagging the modified default selection.

9. The non-transitory computer-readable storage medium of claim 7, wherein the operations further comprise outputting a sample of the video media file at an interval before and after the graphical left temporal boundary and the graphical right temporal boundary.

10. The non-transitory computer-readable storage medium of claim 7, wherein the operations further comprise prompting to tag the modified default selection.

11. The non-transitory computer-readable storage medium of claim 7, wherein the operations further comprise displaying icons of gestures associated with pre-defined commands.

12. The non-transitory computer-readable storage medium of claim 7, wherein the operations further comprise receiving the user input from a touch sensitive display.

13. The non-transitory computer-readable storage medium of claim 7, wherein the operations further comprise adding a default tag to the modified default selection.

14. An apparatus comprising:
a processor; and
memory for storing code that when executed causes the processor to perform operations, the operations comprising:
graphically representing a video media file on a display as a linear icon having a long axis representing increasing time;
receiving a user input at a point of engagement of the display that selects a time along the linear icon;
graphically representing a default selection in the linear icon of a portion of the video media file;
graphically creating a centroid in the default selection at the point of engagement;
receiving a single contiguous gesture starting in an upward direction from the centroid and ending with disengagement of the display;
relating the single contiguous gesture to a pre-defined command configured to equally expand a graphical left temporal boundary and a graphical right temporal boundary from the centroid of the default selection as the gesture continually moves upward;
applying the pre-defined command upon the disengagement to create a modified default selection;
trimming unselected portions from the video media file; and
displaying the portion of the video media file that corresponds to the modified default selection.

15. The apparatus of claim 14, wherein the operations further comprise outputting a sample of the video media file at an interval before the left temporal boundary of the default selection.

16. The apparatus of claim 14, wherein the operations further comprise outputting a sample of the video media file at an interval after the right temporal boundary of the default selection.

17. The apparatus of claim 14, wherein the operations further comprise prompting to tag the modified default selection.

18. The apparatus of claim 14, wherein the operations further comprise tagging the modified default selection.

19. The apparatus of claim 14, wherein the operations further comprise adding a default tag to the modified default selection.

20. The apparatus of claim 14, wherein the operations further comprise permitting a user to disengage and re-engage to complete the single contiguous gesture.

* * * * *